United States Patent
Allen

(10) Patent No.: US 12,442,408 B2
(45) Date of Patent: Oct. 14, 2025

(54) PROTECTIVE SLEEVE FOR COMPOSITE COMPONENTS

(71) Applicant: GOODRICH CORPORATION, Charlotte, NC (US)

(72) Inventor: Jason Bradley Allen, Waco, TX (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 18/424,351

(22) Filed: Jan. 26, 2024

(65) Prior Publication Data
US 2025/0243894 A1 Jul. 31, 2025

(51) Int. Cl.
*F16C 3/02* (2006.01)
*B64C 25/00* (2006.01)

(52) U.S. Cl.
CPC ............ *F16C 3/026* (2013.01); *B64C 25/001* (2013.01)

(58) Field of Classification Search
CPC ......... F16C 3/026; F16C 3/023; B64C 25/001
See application file for complete search history.

(56) References Cited

U.S. PATENT DOCUMENTS

| | | | | |
|---|---|---|---|---|
| 4,704,918 A * | 11/1987 | Orkin | ...................... | F16C 7/026 464/181 |
| 4,715,739 A * | 12/1987 | Ruegg | ...................... | F16C 3/026 403/30 |
| 7,963,853 B2 * | 6/2011 | Brace | ...................... | F16C 3/026 464/181 |
| 8,157,469 B2 * | 4/2012 | Kennedy | ................. | F16C 7/026 403/309 |
| 8,529,361 B2 * | 9/2013 | Hechler-Stabbert | ...... | F02C 7/36 464/181 |
| 8,801,526 B1 * | 8/2014 | Conger | ................... | F16C 3/023 464/180 |
| 8,863,390 B1 * | 10/2014 | Ley | ......................... | F16C 3/023 29/469 |
| 8,956,711 B2 | 2/2015 | Musaefendic | | |
| 9,638,241 B2 * | 5/2017 | Gallant | .................. | G01D 21/00 |
| 2004/0247857 A1 * | 12/2004 | Schroeder | ................ | B32B 5/18 428/319.1 |
| 2007/0158188 A1 * | 7/2007 | Ivanov | ................ | H01J 37/3441 204/298.02 |
| 2022/0082125 A1 * | 3/2022 | Baird | ..................... | F16C 33/785 |

FOREIGN PATENT DOCUMENTS

| | | |
|---|---|---|
| CA | 3040493 | 12/2019 |
| DE | 102012012930 | 1/2014 |
| DE | 202015006737 | 10/2015 |
| EP | 3114003 | 4/2018 |

OTHER PUBLICATIONS

European Patent Office, European Search Report dated Jul. 28, 2025 in Application No. 25152950.9.

* cited by examiner

*Primary Examiner* — Thomas C Diaz
(74) *Attorney, Agent, or Firm* — SNELL & WILMER L.L.P.

(57) ABSTRACT

A composite component is provided. The composite component includes an internal structure, a composite structure formed around at least a portion of the internal structure, and a protective sleeve formed around at the composite structure.

16 Claims, 5 Drawing Sheets

PROTECTIVE SLEEVE FOR COMPOSITE COMPONENTS

FIELD

The present disclosure relates generally to composite components and, more particularly, to protective sleeves for composite components.

BACKGROUND

Many aircraft components, such as those found in landing gear assemblies, are conventionally made from metal. Developments in fiber-reinforced polymer-matrix composites (PMC), i.e. composite structures, are being explored that utilize extra layers for impact protection. That is, while composite structures may have various weight-saving benefits, conventional composite structures may be more prone to impact damage, such as damage from bird strikes, liberated pieces of tire tread, and/or other debris. However, typical solutions to this impact damage problem, i.e. the extra layers, increase the weight thereby lessening the weight savings of using composite structures.

SUMMARY

A composite component is disclosed herein. The composite component includes an internal structure, a composite structure formed around at least a portion of the internal structure, and a protective sleeve formed around the composite structure.

In various embodiments, the internal structure includes one or more metallic end fittings coupled by a composite mandrel. In various embodiments, the composite structure is a carbon fiber reinforced polymer material. In various embodiments, the protective sleeve is formed in two or more portions and fitted to the composite structure. In various embodiments, forming the protective sleeve includes manufacturing the two or more portions to match a respective portion of an outer shape or geometry of the composite structure.

In various embodiments, the protective sleeve is manufactured from a metallic foam. In various embodiments, the metallic foam is at least one of an aluminum foam, a copper foam, a nickel-chromium-based superalloy foam, a nickel foam, a steel foam, a tin foam, a zinc foam, or a brass foam. In various embodiments, the metallic foam is at least one of heat resistant or fire resistant. In various embodiments, the composite component further includes an elastomeric strip between the composite structure and the protective sleeve. In various embodiments, the elastomeric strip is helically wound around the composite structure to provide a radial space between the protective sleeve and an outer surface of the composite structure. In various embodiments, the composite component further includes a set of fasteners configured to fasten the protective sleeve around the composite structure.

Also disclosed herein is an aircraft. The aircraft includes at least one composite component. The at least one composite component includes an internal structure, a composite structure formed around the internal structure, and a protective sleeve formed around the composite structure.

In various embodiments, the internal structure includes one or more metallic end fittings coupled by a composite mandrel. In various embodiments, the composite structure is a carbon fiber reinforced polymer material. In various embodiments, the protective sleeve is formed in two or more portions and fitted to the composite structure. In various embodiments, forming the protective sleeve includes manufacturing the two or more portions to match a respective portion of an outer shape or geometry of the composite structure.

In various embodiments, the protective sleeve is manufactured from a metallic foam. In various embodiments, the metallic foam is at least one of an aluminum foam, a copper foam, a nickel-chromium-based superalloy foam, a nickel foam, a steel foam, a tin foam, a zinc foam, or a brass foam. In various embodiments, the metallic foam is at least one of heat resistant or fire resistant. In various embodiments, the at least one composite component further includes an elastomeric strip between the composite structure and the protective sleeve. In various embodiments, the elastomeric strip is helically wound around the composite structure to provide a radial space between the protective sleeve and an outer surface of the composite structure. In various embodiments, the at least one composite component further includes a set of fasteners configured to fasten the protective sleeve around the composite structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
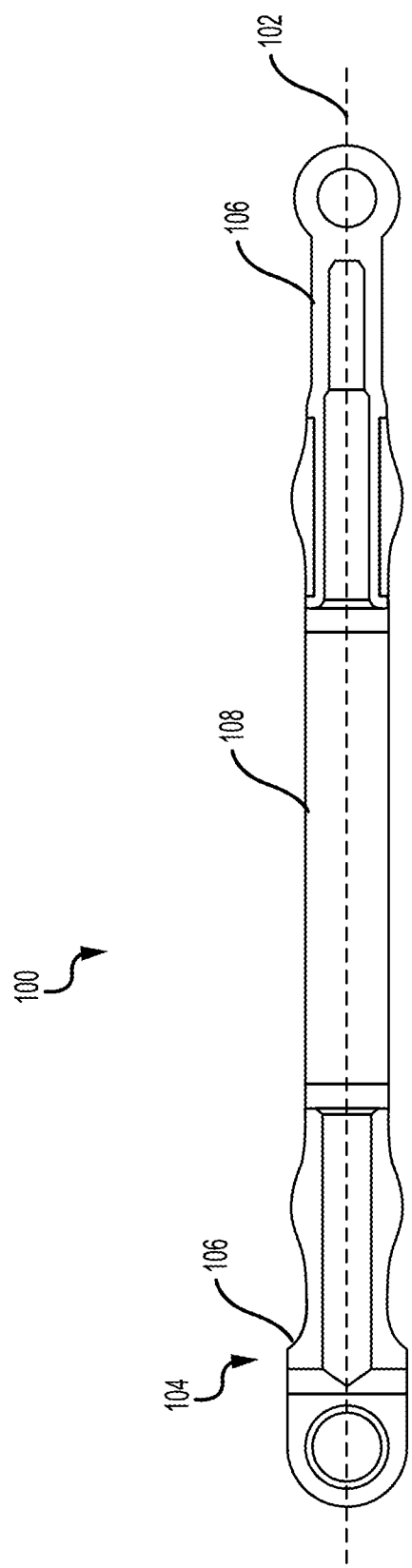
FIG. 1 illustrates an internal structure of a composite component, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As mentioned previously, composite structures in aircrafts require extra layers for impact protection. However, typical solutions for impact protection require extra layers and such extra layers increase the weight thereby lessening the weight savings of using composite structures. Accordingly, disclosed herein are methods and systems for a protective sleeve for composite structures, hereinafter referred to as composite components. In various embodiments, the protective sleeve may be manufactured in two or more portions that are positioned around the composite component. Accordingly, in various embodiments, the protective sleeve may be manufactured with custom conformal shapes and/or geometry to match the outer shape and/or geometry of the composite component with which the protective sleeve is associated. In various embodiments, the protective sleeve may be manufactured from metallic foam for tending to improve impact energy absorption while tending to reduce a weight of the protected sleeve. In various embodiments, the metallic foam is a material or structure comprising a solid metal with gas-filled pores comprising a large portion of the volume. In various embodiments, the metallic foam may be aluminum foam, copper foam, a nickel-chromium-based superalloy foam, nickel foam, steel foam, tin foam, zinc foam, or brass foam, and/or combinations of the foregoing, among others. In various embodiments, the metallic foam may have fire/heat protection capabilities in order to protect the composite component from heat due to nearby heat sources or fires, such as from a braking structure near a landing gear composite component. In various embodiments, once the two or more portions of the protective sleeve are manufactured, the two or more portions are positioned around the composite component and fastened in place, via clamps or straps, among others. In various embodiments, prior to positioning the protective sleeve around the composite component, an elastomeric strip could be helically wound around the composite component to provide a radial space between the protective sleeve and an outer surface of the composite component, which may provide additional impact protection.

Referring now to FIG. 1, an internal structure of a composite component is illustrated, in accordance with various embodiments. In various embodiments, the composite component 100 has a longitudinal centerline axis 102 that extends along a length of the composite component 100. In various embodiments, the internal structure 104 of the composite component 100 may include one or more metallic end fittings 106 that are initially coupled by a composite mandrel 108. In various embodiments, the one or more metal fittings are application specific, i.e. for a brake rod, side braces, drag braces, door control rods, or landing gear rods, among others. In various embodiments, the composite mandrel 108 is a thin composite tube to which the one or more metallic end fittings 106 are affixed in order to lay up fiber-reinforced polymer-matrix composites (PMC).

Figure 2:
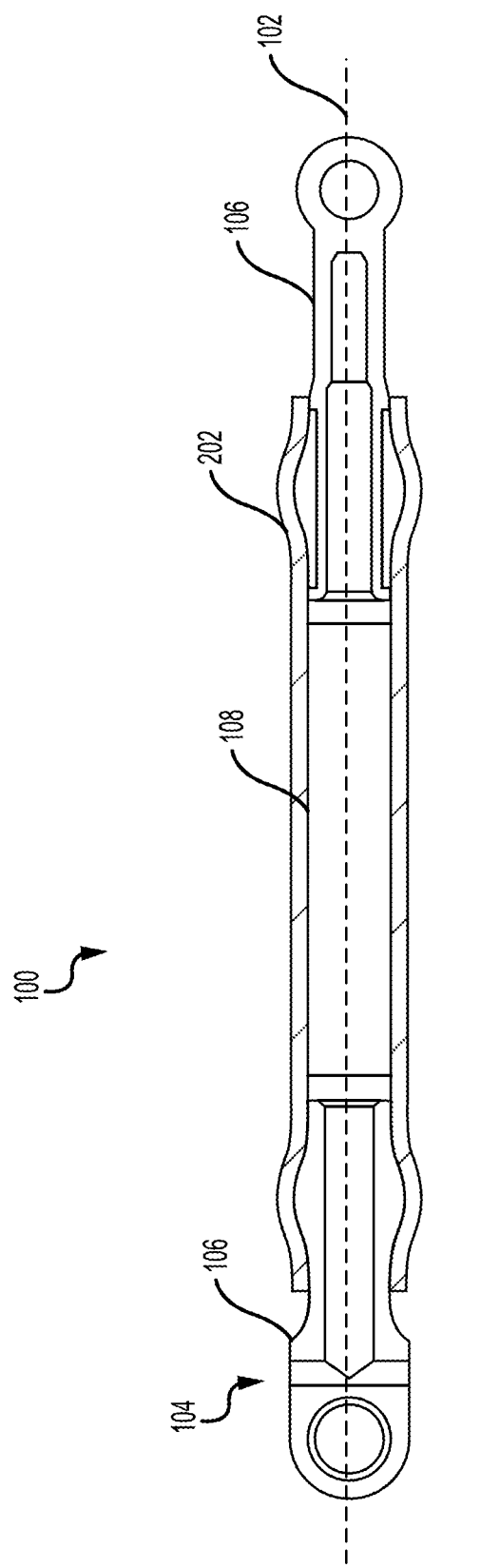
FIG. 2 illustrates a composite component, in accordance with various embodiments.

Referring now to FIG. 2, a composite component is illustrated, in accordance with various embodiments. In various embodiments, once the internal structure 104 of the composite component 100 is formed, as is illustrated in FIG. 1, a composite structure 202 is formed around the internal structure 104 including the composite mandrel 108 and portions of the one or more metallic end fittings 106. In various embodiments, the composite structure 202 may be manufactured from composite materials (e.g., carbon fiber reinforced polymer material), but may be optimized, both in terms of composition and wall thickness, for the intended purpose. That is, the composite structure 202 may be designed for high load transfer. In various embodiments, the composite structure 202 may include a fiber reinforced polymer material. In various embodiments, the composite structure 202 may be formed of a thermoset or a thermoplastic material. In various embodiments, initially forming the composite structure 202 may be performed using various manufacturing methods. For example, the manufacturing method may include laying up a fiber matrix material (e.g., fiber matt, fibers, prepreg, etc.) around/over the composite mandrel 108 and portions of the one or more metallic end fittings 106. The fiber matrix material may be applied over the composite mandrel 108 and portions of the one or more metallic end fittings 106 using winding or wrapping techniques, such as a filament-winding technique or an automatic filament placement technique, among others. In various embodiments, the method may include additively manufacturing steps.

The manufacturing method for the composite structure 202 may include impregnating the fiber matrix material with an uncured polymer thermoset resin, a molten thermoplastic polymer, or a thermoplastic polymer in solution. This resin impregnation step may be repeated with additional layers of fiber or fiber-matrix material. With thermoplastic materials, the manufacturing method may include heating the polymer matrix composite to consolidate, shape, and anneal the thermoplastic composite tube. Examples of thermoset polymer resins used in the various embodiments include, but not limited to, epoxy, polyimide, bis-maleimide, polyurethane, and blends or combinations thereof. Examples of thermoplastic polymers used in the various embodiments include, but are not limited to, polyetheretherketone, polyetherimide, polysulfone, polyphenylsulfone, polyphenylene sulfide, and blends or combinations thereof. Examples of fibers used in the various embodiments include, but not limited to, carbon fibers, aramid fibers, glass fibers, and combinations thereof.

Figure 3:
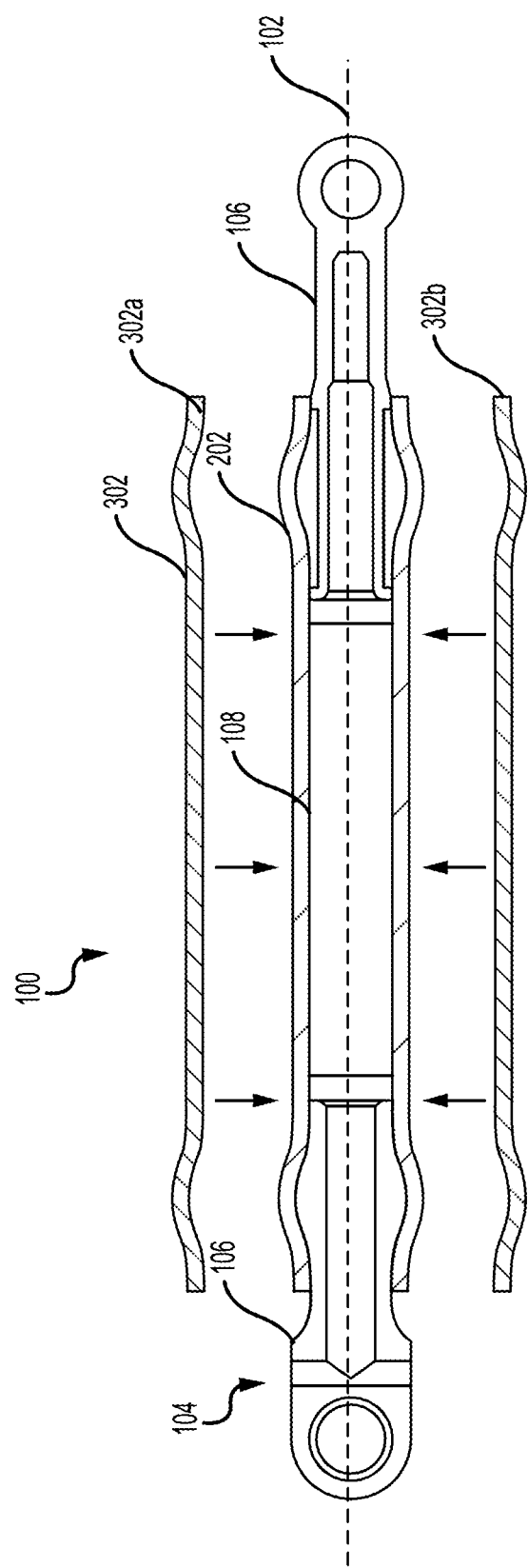
FIG. 3 illustrates a protective sleeve for composite component, in accordance with various embodiments.

Referring now to FIG. 3, a protective sleeve for composite component is illustrated, in accordance with various embodiments. In various embodiments, a protective sleeve 302 is formed to fit around the composite component 100. In various embodiments, the protective sleeve 302 may be manufactured in two or more portions 302*a* and 302*b* that are positioned around the composite component 100. While in FIG. 3 only the two or more portions 302*a* and 302*b* are illustrated, the various embodiments include are not limited to only two portions. That is, depending on the complexity of the composite component 100, it is recognized that three, four, or more portions may be utilized to fully protect the composite component 100. Accordingly, in various embodiments, the protective sleeve 302 may be manufactured with custom conformal shapes and/or geometry to match the outer shape and/or geometry of the composite component 100. In various embodiments, the protective sleeve 302 may be manufactured from metallic foam for tending to increase impact energy absorption while tending to decrease a weight of the protected sleeve. In various embodiments, the metallic foam may be aluminum foam, copper foam, a nickel-chromium-based superalloy foam, nickel foam, steel foam, tin foam, zinc foam, or brass foam, among others. In various embodiments, the metallic foam may be heat resistant or fire resistant, i.e. have fire/heat protection capabilities, in order to protect the composite component from heat due to nearby heat sources or fires, such as from a braking structure near a landing gear composite component. In various embodiments, the metallic foam may provide customizable densities. i.e. densities between 4% and 70%, that provide improved energy absorption per pound relative to adding more composite layers. In various embodiments, once the two or more portions 302a and 302b of the protective sleeve 302 are manufactured, the two or more portions 302a and 302b are positioned around the composite component 100 as illustrated by arrows 304.

Figure 4:
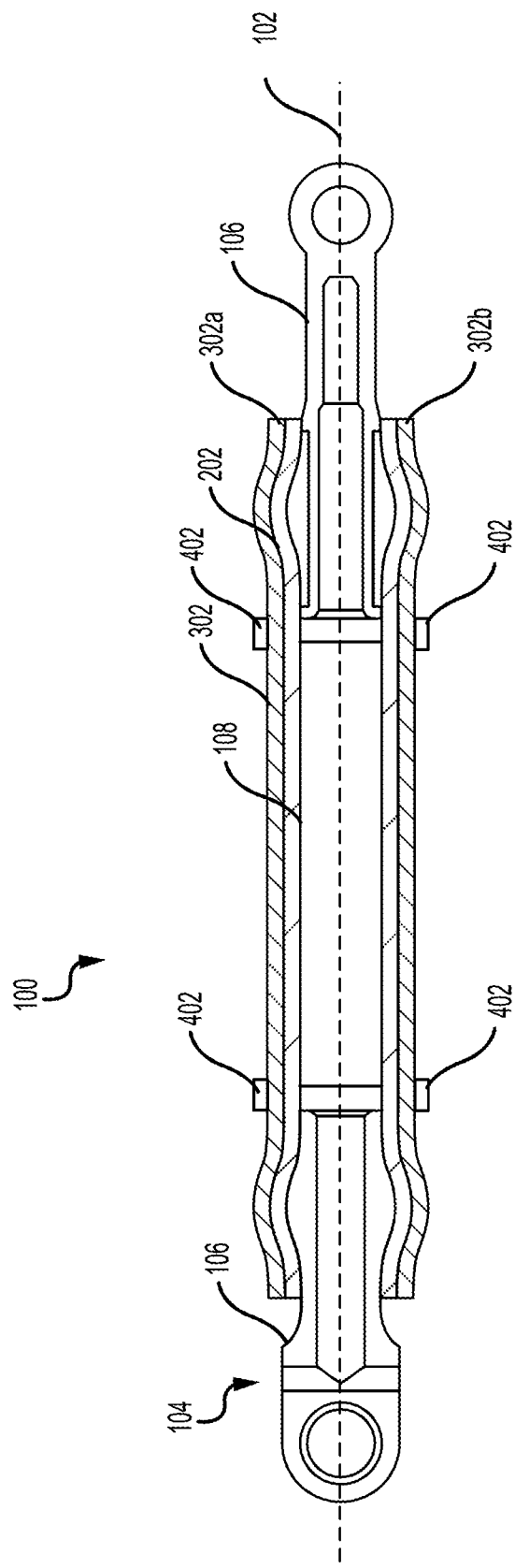
FIG. 4 illustrates a protective sleeve fitted to a composite component, in accordance with various embodiments.

Referring now to FIG. 4, a protective sleeve fitted to a composite component is illustrated, in accordance with various embodiments. In various embodiments, the two or more portions 302a and 302b of the protective sleeve 302 are fitted around the composite component 100. In various embodiments, once fitted to the composite component 100, the two or more portions 302a and 302b of the protective sleeve 302 may be fastened in place via fasteners 402, such as clamps or straps, among others.

Figure 5:
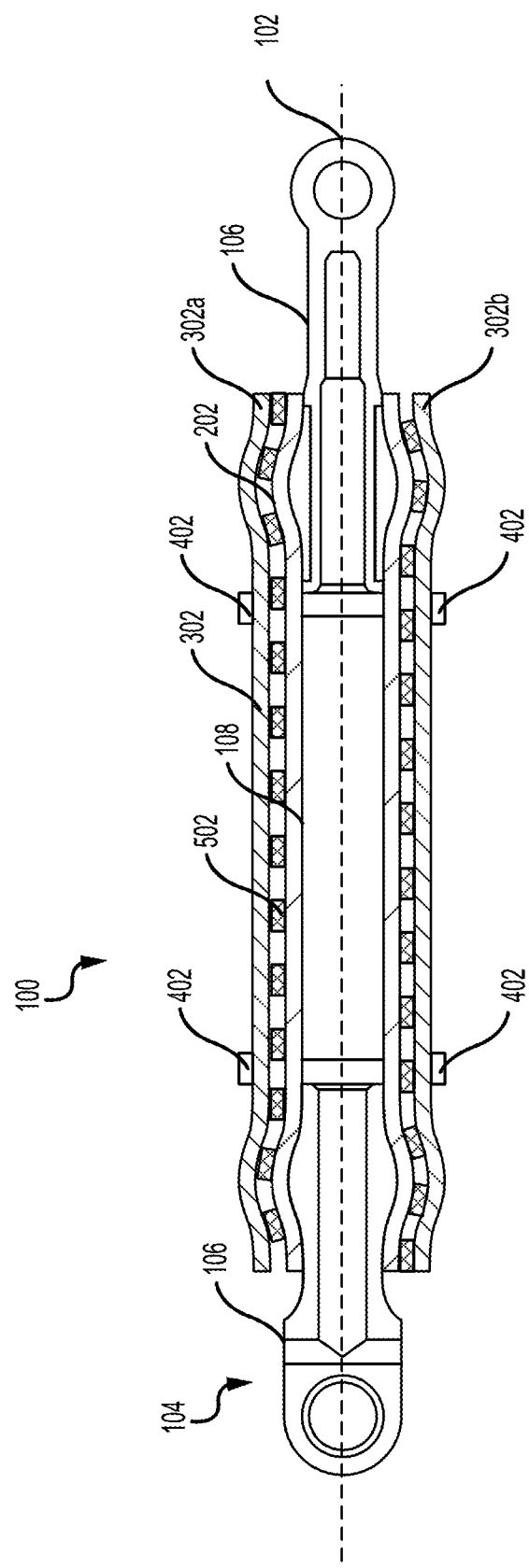
FIG. 5 illustrates additional impact protection for a composite component, in accordance with various embodiments.

Referring now to FIG. 5, additional impact protection for a composite component is illustrated, in accordance with various embodiments. In various embodiments, prior to positioning the two or more portions 302a and 302b of the protective sleeve 302 around the composite component 100, an elastomeric strip 502 is helically wound around the composite structure 202 of the composite component 100 to provide a radial space between the protective sleeve 302 and an outer surface of the composite structure 202. In various embodiments, the two or more portions 302a and 302b of the protective sleeve 302 are then fitted around the composite component 100. In various embodiments, once fitted to the composite component 100, the two or more portions 302a and 302b of the protective sleeve 302 may be fastened in place via fasteners 402, such as clamps or straps, among others.

In various embodiments, by protecting the composite component with the aforementioned protective sleeve, damaged protective sleeves may be replaced rather than replacing the composite component. In that regard, in various embodiments, damage to composite components having a protective sleeve may be inspected. Responsive to a depth of impact of a protective sleeve exceeding a predetermined radial value, the protective sleeve may be removed and damage to the composite component may then be inspected. Responsive to no damage occurring to the composite component, the protective sleeve may be replaced, thereby reducing operator costs. Additionally, responsive to a depth of impact of a protective sleeve failing to exceed the predetermined radial value, the protective sleeve may be left in service.

That is, the protective sleeve may be specifically configured to provide visual inspection benefits. The Federal Aviation Administration ("FAA"), with reference to FAA AC 20-107B, defines various categories of damage (e.g., categories 1-4), with category 1 referring to minimal damages, such as surface scratches, handling damage, etc. For example, barely visible impact damage ("BVID") is a type of category 1 damage that refers to damage to a composite material caused by low force impacts, such as those described above pertaining to a tool drop during maintenance, which is at least "barely visible." Said differently, if a tool is known to have been dropped onto a conventional composite material (without the protective sleeve) but no damage is visible, an approved non-destructive inspection may need to be performed to determine the presence/extent of damage that was done to the composite structure. However, if the protective sleeve had been utilized in this scenario, the protective sleeve may be designed to have a sufficiently low BVID threshold such that the low impact force results in visible damage to the protective sleeve, thereby allowing the operator to visibly confirm the extent of damage without having to complete a non-destructive inspection. Said differently, the load-bearing and weight saving properties of the composite component may be optimized while the protective sleeve may be designed for BVID considerations.

If the impacting body exceeds the category 1 threshold (e.g., the BVID energy threshold), the impact shield can be designed to fully absorb the impact or partially absorb the energy of impact, according to various embodiments. Again, with reference to FAA AC 20-107B, BVID falls under Category 1 damage and thus the impact shield may be designed to fully absorb this energy. For category 2 through 4 damage, the impact shield may be designed to fully absorb or partially absorb the damage. If the shield fully absorbs the damage, then the main composite tube will not be required to be sized/certified for Category 2 through 4 damages, thus saving weight and development costs. If the shield partially absorbs the impact, scenarios could exist where:

Category 4 event will only produce a Cat 1, 2, or 3 damage on the main tube.

Category 3 event will only produce a Cat 1 or 2 damage on the main tube.

Category 2 event will produce a Cat 1 or lower damage on the main tube.

In these scenarios above, the certification standard will be lower on the composite tube, thus reducing the weight and development cost of the design. Weight trade studies, customer input, and regulatory input may all contribute to determining to what extent the impact shield should be designed to absorb different categories of impact energy.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A composite component comprising:
   an internal structure, wherein the internal structure comprises one or more metallic end fittings coupled by a composite mandrel;
   a composite structure formed around at least a portion of the internal structure including the composite mandrel and portions of the one or more metallic end fittings;
   a protective sleeve formed around the composite structure; and
   an elastomeric strip between the composite structure and the protective sleeve, wherein the elastomeric strip is helically wound around a full length of the composite structure to provide a radial space between the protective sleeve and an outer surface of the composite structure.

2. The composite component of claim 1, wherein the composite structure is a carbon fiber reinforced polymer material.

3. The composite component of claim 1, wherein the protective sleeve is formed in two or more portions and fitted to the composite structure.

4. The composite component of claim 3, wherein forming the protective sleeve comprises manufacturing the two or more portions to match a respective portion of an outer shape or geometry of the composite structure.

5. The composite component of claim 1, wherein the protective sleeve is manufactured from a metallic foam.

6. The composite component of claim 5, wherein the metallic foam is at least one of an aluminum foam, a copper foam, a nickel-chromium-based superalloy foam, a nickel foam, a steel foam, a tin foam, a zinc foam, or a brass foam.

7. The composite component of claim 5, wherein the metallic foam is at least one of heat resistant or fire resistant.

8. The composite component of claim 1, further comprising:
   a set of fasteners configured to fasten the protective sleeve around the composite structure.

9. An aircraft, the aircraft comprising:
   at least one composite component, the at least one composite component comprising:
      an internal structure, wherein the internal structure comprises one or more metallic end fittings coupled by a composite mandrel;
      a composite structure formed around the internal structure including the composite mandrel and portions of the one or more metallic end fittings;
      a protective sleeve formed around the composite structure; and
      an elastomeric strip between the composite structure and the protective sleeve,
   wherein the elastomeric strip is helically wound around a full length of the composite structure to provide a radial space between the protective sleeve and an outer surface of the composite structure.

10. The aircraft of claim 9, wherein the composite structure is a carbon fiber reinforced polymer material.

11. The aircraft of claim 9, wherein the protective sleeve is formed in two or more portions and fitted to the composite structure.

12. The aircraft of claim 11, wherein forming the protective sleeve comprises manufacturing the two or more portions to match a respective portion of an outer shape or geometry of the composite structure.

13. The aircraft of claim 9, wherein the protective sleeve is manufactured from a metallic foam.

14. The aircraft of claim 13, wherein the metallic foam is at least one of an aluminum foam, a copper foam, a nickel-chromium-based superalloy foam, a nickel foam, a steel foam, a tin foam, a zinc foam, or a brass foam.

15. The aircraft of claim 13, wherein the metallic foam is at least one of heat resistant or fire resistant.

16. The aircraft of claim 9, further comprising:
    a set of fasteners configured to fasten the protective sleeve around the composite structure.

* * * * *